United States Patent [19]
Bheda et al.

[11] Patent Number: 6,002,441
[45] Date of Patent: Dec. 14, 1999

[54] AUDIO/VIDEO SUBPROCESSOR METHOD AND STRUCTURE

[75] Inventors: Hemant Bheda, Cupertino; Ygal Arbel, Belmont; Partha Srinivasan, Fremont, all of Calif.

[73] Assignee: National Semiconductor Corporation, Santa Clara

[21] Appl. No.: 08/742,583

[22] Filed: Oct. 28, 1996

[51] Int. Cl.[6] .................................................. H04N 7/32
[52] U.S. Cl. ........................... 348/423; 348/384; 348/390
[58] Field of Search .................... 348/423, 384, 348/390, 14, 512, 515, 416; 382/232, 234, 307; 395/800.32, 800.33, 800.34, 800.35; 386/98; 364/131–134; 711/1, 100, 147; 375/240; 712/32–35; H04N 7/32

[56] References Cited

U.S. PATENT DOCUMENTS

| | | | |
|---|---|---|---|
| 4,772,956 | 9/1988 | Roche et al. | 358/433 |
| 5,212,742 | 5/1993 | Normile et al. | 382/234 |
| 5,253,078 | 10/1993 | Balkanski et al. | 358/426 |
| 5,270,832 | 12/1993 | Balkanski et al. | 358/432 |
| 5,379,356 | 1/1995 | Purcell et al. | 348/416 |
| 5,389,965 | 2/1995 | Kuzma | 348/14 |
| 5,467,139 | 11/1995 | Lankford | 348/423 |
| 5,557,538 | 9/1996 | Retter et al. | 348/402 |
| 5,559,562 | 9/1996 | Ferster | 348/584 |
| 5,566,089 | 10/1996 | Hoogenboom | 395/114 |
| 5,594,660 | 1/1997 | Sung et al. | 348/510 |
| 5,598,352 | 1/1997 | Rosenau et al. | 348/423 |
| 5,606,428 | 2/1997 | Hanselman | 358/404 |
| 5,617,502 | 4/1997 | Ort et al. | 386/97 |
| 5,638,531 | 6/1997 | Crump et al. | 711/123 |
| 5,664,218 | 9/1997 | Kim et al. | 348/15 |
| 5,684,534 | 11/1997 | Harney et al. | 348/390 |
| 5,699,460 | 12/1997 | Kopet et al. | 382/232 |
| 5,742,361 | 4/1998 | Nakase et al. | 348/423 |

*Primary Examiner*—Vu Le
*Attorney, Agent, or Firm*—Steven F. Caserza; Flehr Hohbach Test Albritton & Herbert

[57] ABSTRACT

A novel method and apparatus for decoding a compressed audio/video signal to produce decoded audio and decoded video signals. The decoding tasks are partitioned into "pre-processing tasks" and "post-processing tasks." Pre-processing tasks involve one or more non-signal processing oriented operations which do not require extensive computing resources. Pre-processing tasks are assigned to be executed by the host processor, which can perform these tasks without straining it computational resources. Pre-processing tasks include demultiplexing the compressed audio/video stream into compressed audio and compressed video streams, performing audio pre-processing on the compressed audio stream and performing video pre-processing on the compressed video stream. Post-processing tasks involve one or more signal processing oriented operations which require extensive computing resources. Pre-processing tasks are assigned to be executed by a dedicated subprocessor. Post-processing tasks include audio post-processing and video post-processing. In an embodiment, video frame tasks are also performed as part of video post-processing. Post-processing performed by the dedicated subprocessor outputs a decoded audio signal and a decoded video signal.

5 Claims, 5 Drawing Sheets

AUDIO/VIDEO SUBPROCESSOR METHOD AND STRUCTURE

TECHNICAL FIELD

This invention pertains to the storage of video information in digital format, and more specifically to novel apparatus and method for decompressing or "decoding" compressed digital audio/video signals in a highly efficient manner.

BACKGROUND

The CCITT/ISO committee has standardized a set of compression algorithms for still and full motion digital video compression and decompression. These compression schemes are popularly known as JPEG, MPEG and H.261 (P×64). Application of these standards is commonly used in video conferencing, CD-ROM based interactive videos for education and entertainment, digital video transmission for entertainment, still image catalogs, etc. All of the standards mentioned above, as well as emerging HDTV standards, utilize transform code compressed domain formats (referred to herein as "transform domain" formats), which include the Discrete Cosine Transform (DCT) format, the interframe predictive code format, such as the Motion Compensation (MC) algorithm which may be used in conjunction with the DCT format, and hybrid compressed formats. The DCT format is used in the compression standard for still images JPEG (Standard Draft, JPEG-9-R7, February 1991). The combination of Motion Compensation and Discrete Cosine Transform compression algorithm (MC/DCT) is used in a number of standards including: the compression standard for motion pictures (Generic coding of moving pictures and associated audio information, ISO/IEC 13818, ISO/IEC 11172), the standard for video conferencing (ITU-T Recommendation H.261, CODEC for Audiovisual Services at p×64 kbits/s), and some High Definition Television proposals.

FIG. 1 depicts the steps involved in decoding or decompressing a compressed audio/video signal. As shown, the steps involved in decoding of compressed audio/video signal 102 include demultiplexing 104 the compressed audio/video signal into compressed audio 108 and compressed video 106 data streams, performing video decoding on the compressed video data stream and performing audio decoding on the compressed audio data stream.

As stated above, the first step 104 involves demultiplexing the compressed audio/video signal into compressed audio 108 and compressed video 106 streams. Audio decoding is then performed on the compressed audio data stream 108. During audio decoding compressed audio stream 108 is unpacked and its symbols decoded using a table-lookup (also called Variable Length Decoding (VLD)). The decoded quantized audio samples then undergo dequantization and denormalization 118. The denormalized audio samples are then subjected to inverse transformation 120 which includes filtering, windowing and reconstruction. Decoded audio stream 122 is then fed to audio renderer 127 before being forwarded to audio output device 128.

Compressed video data stream 106 is subjected to video decoding. This includes variable length decoding (VLD) during which the compressed video data stream is parsed into symbols 110, dequantization 110, inverse discrete cosine transformation 112 and motion compensation 114. Decoded video data stream 116 is then fed to video renderer 124 before being forwarded to a graphics output device 126 such as a monitor. U.S. patent application Ser. No. 08/525,357, assigned to the assignee of the present application, describes in more detail some of the prior art and other novel techniques for decoding digitally compressed audio/video signals.

There are several prior art techniques used to perform the decompression steps depicted in FIG. 1. One such prior art technique uses advanced microprocessors, for example the 586 microprocessors, to perform real-time video decoding using software. Although this technique achieves real time audio/video decoding, a major drawback of this technique is that considerable CPU resources are consumed during the decoding process. This results in the video delivery being jerky and the audio output lacking full fidelity. As a result, the quality of the output video and audio signals are below their expected quality levels. The inefficient use of limited CPU resources also causes performance degradation of other concurrently executing applications due to lack of CPU resources.

In an effort to solve the inefficient CPU usage problem, prior art techniques perform audio/video decoding using dedicated hardware decoders which off-load the audio/video decoding tasks from the host CPU. These dedicated hardware decoders serve as slave processors to the host CPU, with the slave decoder performing the task of audio/video decoding. An example of such a dedicated hardware decoder is described in U.S. Pat. Nos. 5,253,078, and 5,270,832 assigned to C-Cube Microsystems, Milpitas, Calif. An example of a dedicated audio/video decoder is the CL480 device available from C-Cube Corporation.

One such dedicated hardware audio/video decoder system 130 is depicted in FIG. 2. As shown in FIG. 2, a dedicated hardware decoder 132 communicates with host CPU 134 over a host (PCI or ISA) bus interface 138. Dedicated hardware decoder 132 is also coupled to dynamic random access memory (DRAM) 133, video mixer 142 and audio digital to analog converter (DAC) 146. Video mixer 142 is also coupled to graphics subsystem 144 and DAC 146 is coupled to audio subsystem 148 such as a SoundBlasterm™ sound card.

Dedicated hardware decoder 132 accepts a multiplexed compressed audio/video signal as input. The dedicated hardware decoder then demultiplexes the compressed audio/video signal into compressed audio and compressed video data streams (corresponding to step 104 in FIG. 1). Dedicated hardware decoder 132 then performs variable length decoding, dequantization, inverse discrete cosine transformation and motion compensation on the compressed video data stream. The resultant decoded video data stream is then fed to mixer 142 which also receives a graphics input from graphics subsystem 144. The video output from mixer 142 is then forwarded to a video output device such as a monitor for display.

The compressed audio data stream is subjected to variable length decoding, denormalization, dequantization and inverse transformation including filtering and windowing functions, before being passed through DAC 148 and then forwarded to audio subsystem 148. The audio output from audio subsystem 148 can then be fed to any prior art audio output device.

As described above, the entire task of audio/video decoding is performed by dedicated hardware decoder 132. Host CPU 134 is utilized only for monitoring the audio/video processing tasks to be performed by dedicated hardware decoder 132. While this technique frees up CPU resources which would otherwise be dedicated to the audio/video processing tasks, it also has many disadvantages.

One major disadvantage is that dedicated hardware decoders are very expensive. This is because of the increased logic complexity needed to perform the entire audio/video decoding. Increased complexity also increases the size of the decoder making it more expensive. There is thus a need for a decoder which is cheaper and more compact than existing hardware decoders.

Another disadvantage of dedicated hardware decoders is that the audio/video processing performed by the decoders does not make efficient use of existing system resources. In the system shown in FIG. 2, redundant hardware such as audio/video DAC/mixer is needed for audio/video decoding even though CPU 134 is capable of handling these tasks efficiently. Thus, there is a need for a system which can make efficient use of available system resources.

Prior art systems like the one depicted in FIG. 2 also do not provide the ability to store decoded audio/video data streams in system memory. This makes prior art decoders incompatible with applications which use audio/video data streams stored in system memory as their input. As a result, these applications, which generally perform post-processing on the decoded audio/video data streams such as 3D effects and video resampling (scaling), cannot take advantage of the decoded audio/video outputs. Thus, there is a need for an audio/video decoding system which is compatible with other system applications.

Another disadvantage of prior art dedicated hardware decoders is that they can process only a single compressed audio/video signal at a time. This is due to the fact that the dedicated hardware decoder acts as a "black box," taking in a compressed audio/video signal as input and outputting decoded audio and video streams. It is not possible to perform concurrent processing of audio/video streams. Thus, there is a need for a decoding system which can perform concurrent processing of audio/video streams.

SUMMARY

In accordance with the teachings of this invention, a novel audio/video subprocessor is taught in which hardware acceleration provides improved performance, enhanced features, and frees the host processor to handle other tasks. Unlike prior art audio/video decoders, in accordance with the teachings of this invention, the audio/video decode tasks are partitioned in a novel manner into pre-processing tasks and post-processing tasks.

The pre-processing tasks typically involve non signal processing oriented operations, such as bit manipulations, table-lookup, and control, and thus in accordance with the teachings of this invention, these pre-processing tasks are assigned for execution by the system host processor. The host processor is typically a high-end RISC or CISC engine, such as a 586 microprocessor and is capable of handling such tasks efficiently. In addition, the host processor is responsible for other tasks such as data I/O, demultiplexing audio/video streams, audio/video task scheduling and audio/video synchronization which do not require intensive computational resources.

Post-processing tasks, on the other hand, typically involve signal processing oriented operations such as multiply-accumulate and require extensive CPU resources. In accordance with the teachings of this invention, the post-processing tasks are executed by dedicated audio and/or video processing hardware, thereby reducing the burden imposed on the host CPU. In one embodiment, the novel audio/video processing hardware of the invention also performs video frame reformatting and output to the graphics subsystem of the host.

The present invention satisfies the needs inherent in prior art audio/video decoding techniques. In particular, by performing only a subset of the audio/video decode tasks, the architectural complexity of the present invention is greatly reduced. This translates to savings in cost, power consumption and size. The present invention makes efficient use of system resources thus reducing the need for redundant hardware. Elimination of redundant hardware reduces the number of external audio/video cables needed for the decoding process, which translates to reduction in costs and ease of installation. By storing the decoded audio/video outputs in system memory, the present invention, unlike prior art techniques, enables other post-processing applications to utilize the decoded outputs—this enhances compatibility with other system applications.

BRIEF DESCRIPTION OF THE DRAWING

Additional features of the invention will be readily apparent from the following detailed description and appended claims when taken in conjunction with the drawings, in which:

DETAILED DESCRIPTION OF EXEMPLARY EMBODIMENTS

Figure 3:
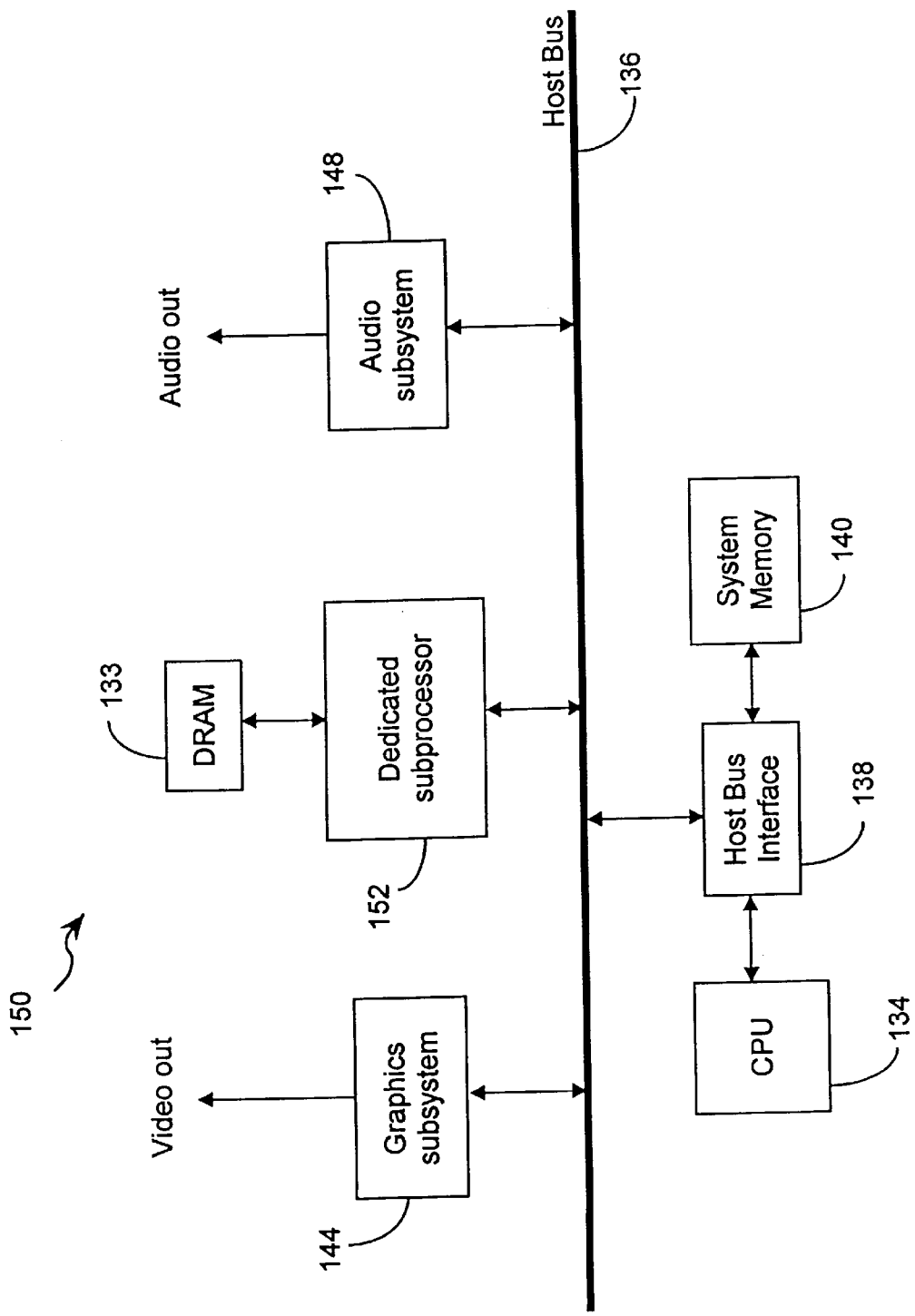
FIG. 3 is a block diagram depicting an exemplary computer system incorporating the invention.

In accordance with the teachings of this invention, FIG. 3 depicts an exemplary computer system 150 incorporating a novel dedicated subprocessor 152 for performing audio/video signal decoding. As depicted in FIG. 3, computer system 150 includes dedicated subprocessor 152 which interfaces with host CPU 134 over host bus 136 using host bus interface 138. Host CPU 134 and dedicated subprocessor 152 have a master-slave relationship, with host CPU 134 acting as master and scheduling the tasks to be executed by dedicated subprocessor 152. In one embodiment, host bus 136 is a generic PCI. Well known prior art techniques like "Scatter-Gather" support to support virtual memory organization may also be implemented in a given embodiment. Dedicated subprocessor 152 is also coupled to an external dynamic random access memory (DRAM) 133. Other components of computer system 150 include system memory 140, graphics subsystem 144 and audio subsystem 148. Dedicated subprocessor 152 uses host bus 136 to interface with system memory 140, graphics subsystem 144 and audio subsystem 148.

Dedicated subprocessor 152 differentiates itself from prior art decoders in that it performs only a subset of the tasks involved in audio/video decoding of a compressed audio/video signal. This is unlike prior art systems in which either all of the audio/video decoding is performed by the host CPU, seriously depleting CPU resources available for other tasks, or prior art systems which include a dedicated hardware decoder to perform all the audio/video decoding tasks at increased complexity and costs.

Figure 4:
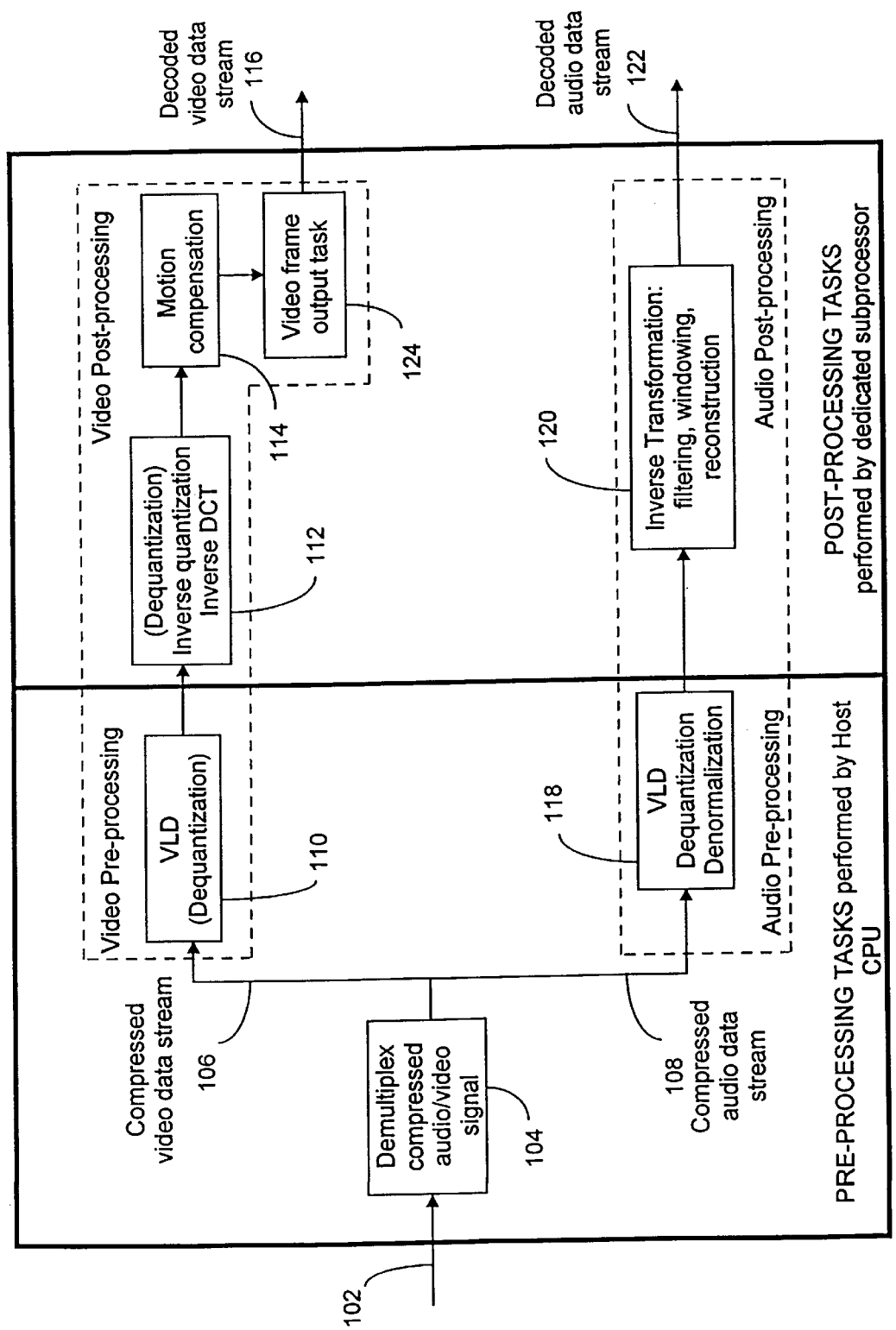
FIG. 4 is block diagram depicting the steps involved in decoding a compressed audio/video signal in accordance with the teachings of the present invention.

In accordance with the present invention, audio/video decoding tasks are divided in a novel manner into "pre-processing tasks" and "post-processing tasks," as shown in FIG. 4. Pre-processing tasks involve one or more non-signal processing oriented operations such as bit manipulations, table lookup, audio/video demultiplexing, audio/video task scheduling and audio/video synchronization. Since pre-processing tasks require minimal computational resources, in accordance with the present invention these pre-processing tasks are assigned to be executed by the host CPU, which can perform these tasks efficiently without straining its computational resources.

Post-processing tasks on the other hand involve one or more signal processing oriented operations, such as multiply-accumulate, inverse quantization, inverse discrete cosine transform, motion compensation, block reconstruction, window filtering and video frame formatting. Post-processing tasks require considerable CPU and memory resources and are thus assigned to be executed by dedicated subprocessor 152 in accordance with the present invention.

In accordance with the division of the audio/video decoding tasks into pre-processing and post-processing tasks, in one embodiment of this invention, host CPU 134 is responsible for demultiplexing the compressed audio/video signal into separate compressed video and compressed audio data streams. Host CPU 134 then performs video and audio pre-processing tasks. Video pre-processing includes performing variable length decoding (VLD) which involves parsing the compressed video signal into symbols 110. In one embodiment of the invention, video pre-processing tasks also include performing dequantization 110 on the symbol stream. However, in an alternate embodiment, the dequantization task is included in video post-processing tasks.

Audio pre-processing includes unpacking the audio symbols using table lookup and then performing denormalization and dequantization 118 on the decoded quantized audio data stream. In one embodiment, host CPU 134, acting as the master, is also responsible for scheduling the tasks to be performed by dedicated subprocessor 152. In addition, host CPU 134 is also responsible for audio/video synchronization which involves coordinating the audio and video decoding tasks such that if the video is ahead of audio, host CPU 134 delays issuing the video task, and if the video lags audio, host CPU 134 strips decoding of the video frame to gain time.

It should be apparent to those skilled in the art that the boundary between pre-processing and post-processing tasks is not rigid, that is, in alternate embodiments of the present invention a particular pre-processing task may be classified as a post-processing task and vice versa. Factors which affect the division of decoding tasks into pre-processing and post-processing tasks include computational power of the host CPU and system bus scheduling restraints.

Dedicated subprocessor 152 is responsible for post-processing the pre-processed audio. and video data streams. This includes audio post-processing and video post-processing. In one embodiment, dedicated subprocessor 152 also performs video frame output tasks.

Dedicated subprocessor 152 receives pre-processed audio/video data either directly from CPU 134 via host bus 136, or via system memory 140. The capability to read pre-processed data from system memory 140 allows CPU 134 and dedicated subprocessor 152 to perform audio/video decoding concurrently. For example, while dedicated subprocessor 152 is post-processing the current frame, host CPU 134 pre-processes the next frame. In one embodiment, partial frame processing is also possible.

Figure 1:
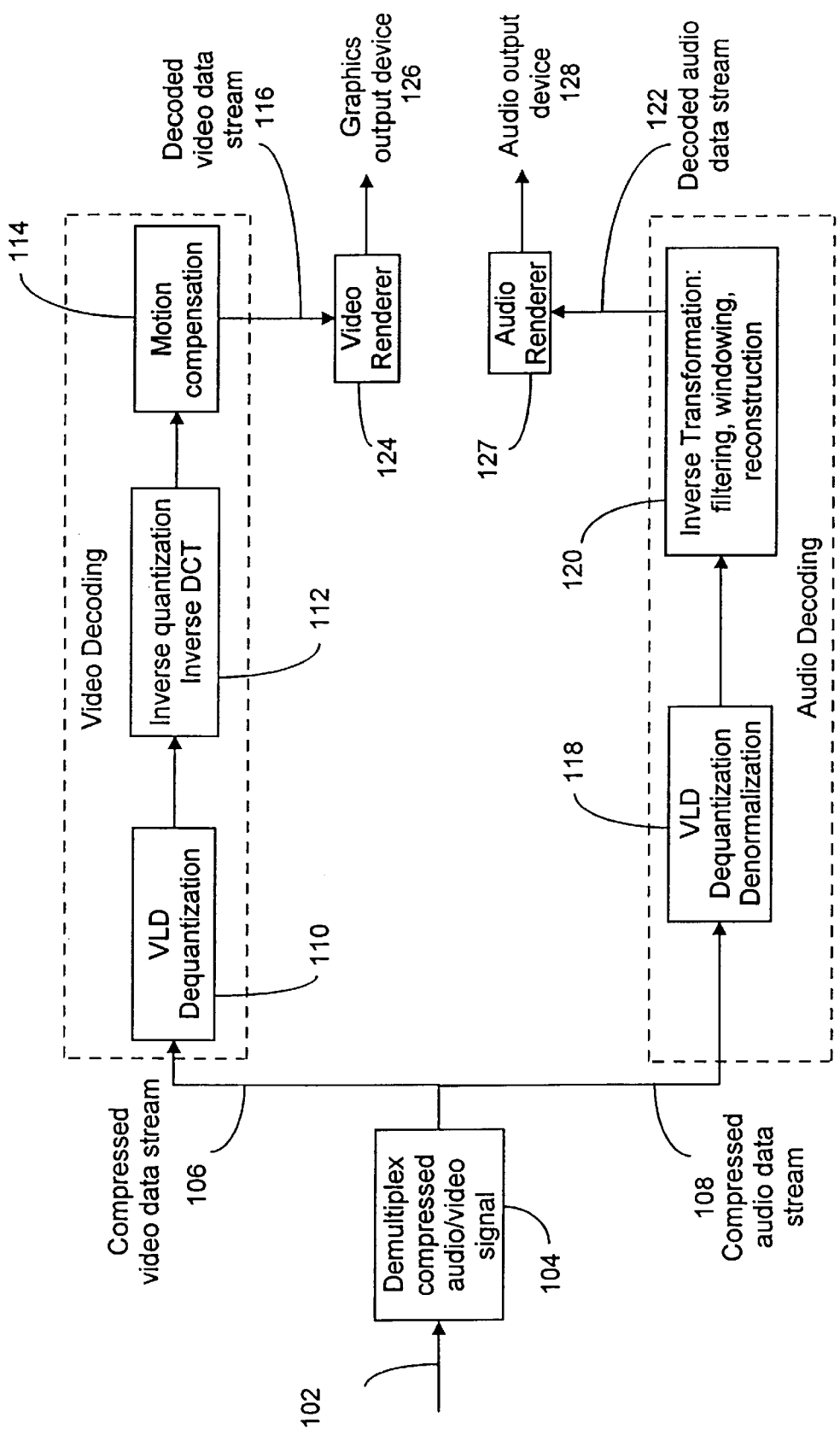
FIG. 1 is a block diagram depicting the various steps involved in decoding or decompressing a multiplexed compressed audio/video signal.
Figure 2:
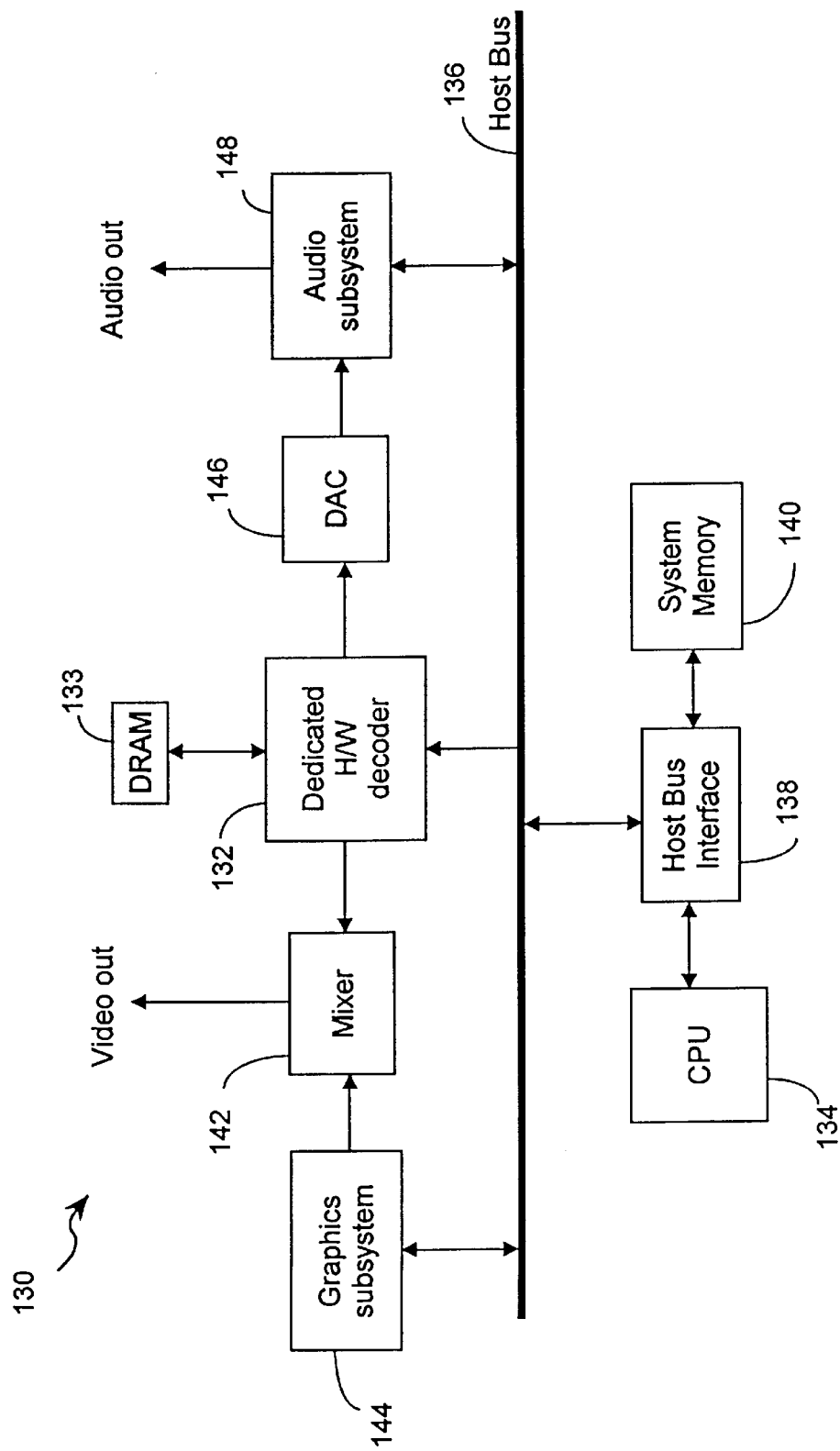
FIG. 2 is a block diagram of a prior art computer system incorporating a dedicated hardware decoder.

As mentioned above, dedicated subprocessor 152 performs audio post-processing which extracts decoded audio data stream from the pre-processed audio data. In accordance with one embodiment-of this invention, dedicated subprocessor 152 reads pre-processed audio symbols from system memory 140 and converts them to pulse code modulation (PCM) samples by performing inverse transform functions 120 including filtering, windowing, and reconstruction functions. The PCM samples are then transferred back to system-memory 140 where they are accessible by host CPU 134 or any typical prior art audio subsystems 148 such as a SoundBlaster™ sound card used in IBM-type personal computers to generate audible sound. As the audio samples are directly stored in memory 140, the need for redundant hardware, for example the DAC 146 shown in FIG. 2, is eliminated. Furthermore, the PCM audio samples stored in system memory 140 are accessible to post-processing applications for further processing. The present invention thus makes efficient use of existing system resources and allows different applications to share the decoded audio data.

Video post-processing performed by dedicated subprocessor 152 extracts decoded video data stream from the pre-processed compressed video data. In accordance with one embodiment of this invention, dedicated subprocessor 152 reads pre-processed video symbols from system memory 140 and converts them into a video frame in native MPEG YCbCr 4:2:0 format. This involves performing inverse quantization and inverse discrete cosine transformation (IDCT) 112, and motion compensation 114 on the pre-processed video data. The output frame is then written to DRAM 133 associated with dedicated subprocessor 152.

In one embodiment of the invention, dedicated subprocessor 152 is also responsible for performing video frame output tasks 124. Dedicated subprocessor 152 reads a frame from local DRAM 133 associated with dedicated subprocessor 152. Dedicated subprocessor 152 converts the read frame to the video format required by the particular graphics-subsystem 144 utilized by computer system 150. The output frame is written to the appropriate location in system memory 140 which can be accessed by host CPU 134, or to a dedicated graphics controller memory which can be accessed by graphics subsystem 144. Graphics subsystem 144 is a typical prior art graphics subsystem commonly employed in computer systems. In case of Unified Memory Architecture (UMA) where graphics memory and dedicated subprocessor memory are physically combined, the video frame output task reformats decoded video data and sends the reformatted video data to a display device or to system memory 140.

As with audio decoding, video decoding performed in accordance with this invention reduces the need for redundant hardware, for example mixer 142 depicted in FIG. 2 is eliminated. Furthermore, video samples stored in system memory 140 can be utilized for further processing by other applications. The present invention thus allows other applications to take advantage of the video decoding output.

In addition to system-level optimization achieved by partitioning the decoding tasks between pre-processing operations to be performed by CPU 134 and post-processing operations to be performed by dedicated subprocessor 152, in accordance with the teachings of this invention the novel subprocessor architecture minimizes chip size and cost by utilizing a unique partitioning and sharing of the hardware resources of subprocessor 152 between audio and video post-processing tasks. As dedicated subprocessor 152 performs only a subset of the tasks involved in compressed audio/video decoding, namely only the post-processing tasks, the complexity of dedicated subprocessor 152 is greatly reduced. This translates to savings in cost, power utilized by the subprocessor, and size of dedicated subprocessor 152.

Figure 5:
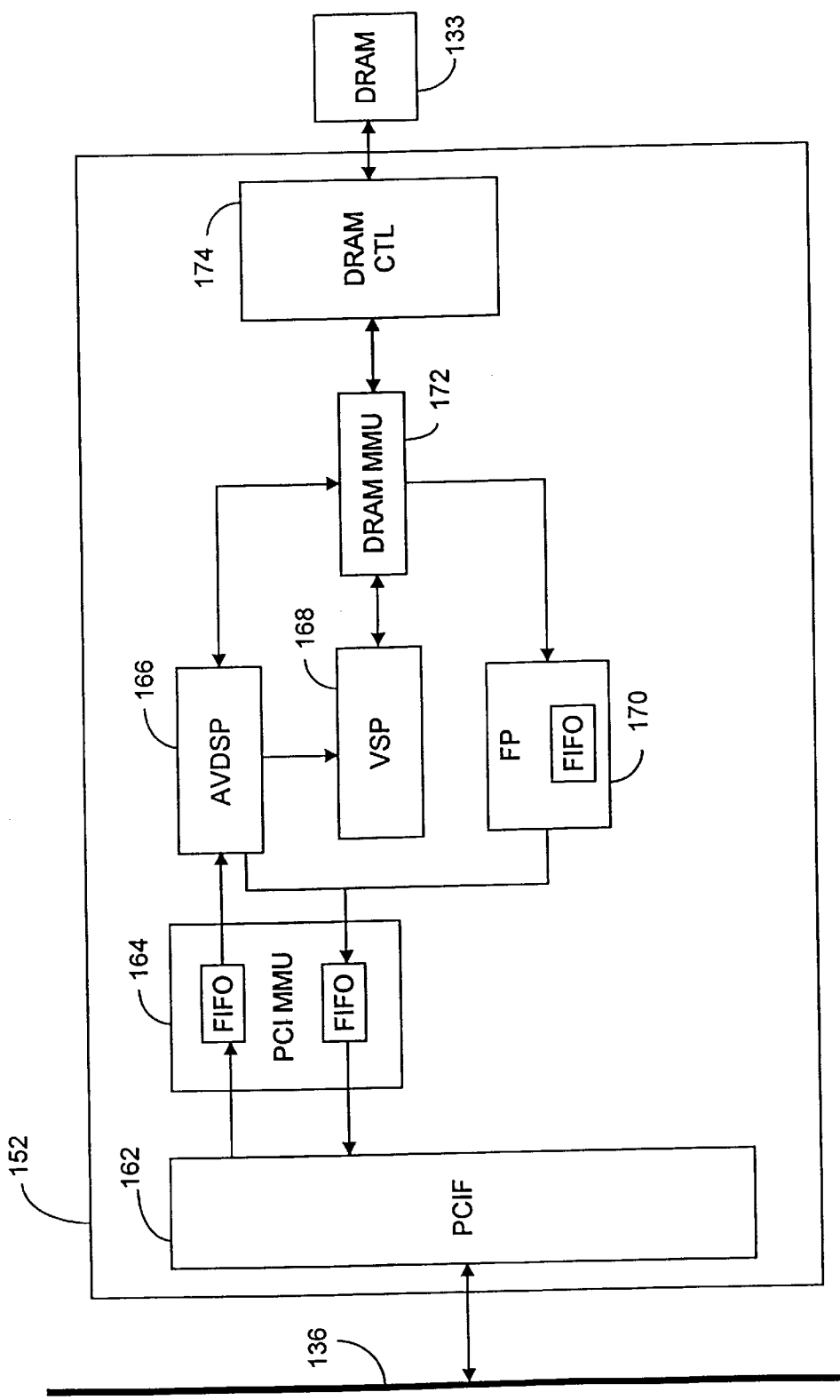
FIG. 5 is a block diagram depicting the internal architecture of the present invention.

Referring to FIG. 5, there is shown a block diagram depicting the internal structure of an embodiment of dedicated subprocessor 152. As shown in FIG. 5, dedicated subprocessor 152 comprises PCI Bus Interface (PCIF) 162, PCI Memory Management Unit (PCI MMU) 164, DRAM Controller 174, DRAM Memory Management Unit (DRAM MMU) 172, Audio/Video Data Signal Processor unit (AVDSP) 166, Video Signal Processor (VSP) 168 and Frame Packer (FP) 170.

PCI interface 162 enables dedicated subprocessor 152 to interface with the host system via PCI host bus 136. PCI MMU 164 contains FIFO (first in first out) queues for receiving and transferring data to and from other parts of the host computer system. In particular, during video post-processing, pre-processed video symbols are received from main memory 140 using bus mastering mode or directly from host CPU 134 using slave mode. During audio post-processing, pre-processed audio symbols are received from main memory 140 or directly from host CPU 134. PCI MMU FIFO queues are also used to transfer post-processed audio and video data to system memory 140 or to the audio/video graphics subsystems.

Dedicated subprocessor 152 interfaces with DRAM 133 via DRAM controller 174, which is a typical DRAM controller known in the prior art. In one embodiment of the invention, DRAM controller 174 includes refresh circuitry. In another embodiment, DRAM Controller 174 supports fast-page mode, two clocks per CAS cycle, and has a memory architecture of 16 bits wide by at least 256K bytes. DRAM MMU 172 interfaces with DRAM Controller 174 and includes arbitration logic, address generation logic.

Audio/Video Data Signal Processor (AVDSP) 166 is used for all audio post-processing, and a subset of video post-processing. All data coefficients required for audio filtering and windowing reside in the on-chip ROM contained within AVDSP 166. During audio post-processing, AVDSP 166 receives pre-processed 16-bit audio samples from host CPU 134 using slave mode or from system memory 140 using bus mastering mode. AVDSP 166 performs inverse quantization functions on the pre-processed audio samples including filtering, windowing and reconstruction of audio samples. These functions are well known in the prior art. Audio decoded output samples (frames/pictures), for example 16-bit samples in one embodiment, are written back to a graphics output buffer using slave mode or to system memory 140 using bus mastering mode via PCI bus interface 162. In cases where the audio has stereo characteristics, the left and right output audio samples are interleaved.

During video decoding, AVDSP 166 receives pre-processed video symbols from main memory 140 or from host CPU 134 via PCI bus interface 162. In one embodiment, AVDSP 166 performs inverse-quantization, source and destination blocks address calculation, and controls Video Signal Processor (VSP) 168 on a block-by-block basis. Decoded video output samples are written back to a graphics buffer or system memory 140 using PCI bus interface 162.

Video Signal Processor (VSP) 168 is responsible for performing inverse discrete cosine transformation (IDCT) and motion compensation on the video data stream. In one embodiment, VSP 168 is an engine for video IDCT, motion compensation and block reconstruction.

Frame Packer (FP) 170 is responsible for executing video frame output tasks. In one embodiment, FP 170 is capable of transferring a frame from private DRAM 133 to graphics subsystem 144 or system memory 140, with on-the-fly format conversion. In another embodiment, color-space conversion or stretching, which is generally performed by graphics subsystem 144, is also performed by FP 170. FP 170 is also capable of supporting a plurality of different graphics formats, such as well known variations of the 4:2:2 packed format.

Audio Decode Task Performed by the Invention

The audio decode task consists of transforming the frequency-domain, pre-processed samples available from the host to time-domain samples for use by a sound system. The pre-processed audio symbol data is independent of layer, sample-rate, and bitrate parameters, the only relevant parameter being the number of channels (mono or stereo). In addition, the concept of audio frame is no longer directly involved, a fact that allows the host to more easily match audio task size to the video frame rate, for easier synchronization and control.

The audio decoding process requires maintaining a vector containing a filtered version of the past 512 samples. Two such vectors (one for each stereo channel) are maintained in private DRAM 133. Each such vector is exactly 1024 bytes in size, and fits in a single DRAM page. The vector samples are not accessed in sequential order, but there is no performance penalty, because the 16-bit wide DRAM configuration and the 1 KByte to page size guarantee efficient memory bandwidth utilization.

Sub-sampling by a factor of two is also supported as an option. This option may be desirable if there is a need to reduce the data traffic caused by the audio playback in certain systems. To achieve the sub-sampling without aliasing, the host software sets all the upper-half frequency-domain samples in the pre-processed audio symbol data to zero, and sets the "subsample" bit in dedicated subprocessor control register.

Video Decode Task Performed by the Invention

The video decode task consists of decoding a frame. During video decode, AVDSP 166 performs inverse-quantization, address calculation for forward, backward and destination blocks, and VSP 168 control. VSP 168 performs IDCT and frame reconstruction, as programmed by AVDSP 166.

Video Frame Output Task Performed by the Invention

The frame output task reads a 4:2:0 frame from private DRAM 133, converts it into one of the supported graphics formats, and writes the frame to graphics subsystem 144 or main memory 140.

Task Scheduling

CPU 134 monitors scheduling of audio and video post-processing tasks performed by dedicated subprocessor 152. In one embodiment, CPU 134, after pre-processing a frame, schedules the frame for post-processing to be performed by dedicated subprocessor 152. Dedicated subprocessor 152 after completing the scheduled post-process task, sends an interrupt to CPU 134 notifying CPU 134 that the post-processing task has been completed and that the next post-process task can be scheduled. A disadvantage of this technique is that a finite amount of time is lost in the communication protocol between CPU 134 and dedicated subprocessor 152. This increases the total time taken for audio/video decoding and reduces the efficiency of the decoding system.

In an alternate embodiment, the present invention solves the above-mentioned problem by making use of a "task queue." CPU 134 schedules post-processing tasks by writing them to one end of the task queue. Dedicated subprocessor 152 reads the other end of the task queue to ascertain the next post-processing task that is to be executed. This allows CPU 134 to schedule post-processing tasks independent of dedicated subprocessor 152. Dedicated subprocessor 152 accesses the next post-processing task from the task queue without having to interrupt CPU 134. This increases the efficiency of the audio/video decoding process.

The Audio Decode task is always executed by itself, while the Video tasks (Decode and Frame Output) may be executed concurrently or separately. The Video Decode task writes the decoded frame to private memory, while the frame output task reads the decoded frame from private memory. When the video decode and frame output tasks are executed concurrently, a lock mechanism is used to keep one task ahead of the other. For example, this is necessary in well known prior art techniques such as bi-directional frame decode, where the frame decode output is written into the same frame buffer which is currently being output to display. Two types of locking mechanisms are supported:

1. The "read before write" locking mechanism assures that the frame output task reads and transfers the old decoded frame before the video decode task decodes the new frame.
2. The "write before read" locking mechanism assures that the frame output task transfers the new frame as it is being decoded by the video decode task.

A video decode task typically decodes a complete video frame. An audio task typically decodes a number of samples which are equivalent in duration to one video frame.

Pre-processed Audio-Symbol Data Format

Audio pre-processed symbol data is the output of the dequantization-denormalization step of the decoding process (pre-processing) performed by host CPU 134. Each audio sample is one 16-bit word per channel. The basic data unit is one chunk of 64 samples. If mono, it contains two sets of 32 subband samples. If stereo, it contains one set of 32 subband samples interleaved (left-right-left-right . . . ). If subsample by two mode is selected, the upper 16 subband samples per channel are zero.

Pre-processed Video Symbol Data Format

Video pre-processed data is arranged as described below. Each data element is a 16-bit word. The format uses terms and concepts described in the compression standard for motion pictures (Generic coding of moving pictures and associated audio information, ISO/IEC 13818, ISO/IEC 11172).

```
if(NOOP){
    NOOP;                    //optional.
}
PICTURE_START;               //picture start code
if (QMAT_PACKET){            //optional
    QMAT_PACKET;             //qmat packet start code
    qmatrix[64];             //quant matrix data
                             (128 bytes)
}
if (QSCALE){                 //optional
    QSCALE;                  //quantization scaler
}
while (!PICTURE_END){
    MBLK_TYPE;               //macroblock header and type
                             info
    if(qs){                  //if a qscale is transmitted . . .
        QSCALE;
    }
    if((!intra)&&(fmv)){     //if a forward motion
```

-continued

```
                             vector . . .
    F_HOFF;                  //forward horizontal offset
    F_VOFF;                  //forward vertical offset
}
if((!intra)&&(bmv)){         //if a backward motion
                             vector . . .
    B_HOFF;                  //backward horizontal offset
    B_VOFF;                  //backward vertical offset
}
if((!intra)&&(pat)){         //macroblock pattern
    PATTERN;
}
if((intra)||(pat)){
    if(intra)n=6;
    else n=one_count(PATTERN[5:0]);  //number of 1'
                                     bits in PATTERN.
    for (i=0; 1<n, i++){     //block info
                             only for non-
                             zero blocks.
        while(!EOBLK){
            ZLEN_COEFF;
        }                    //end-of-block
                             reached
    }                        // end of
                             macroblock data
}
}                            //end of
                             picture.
```

The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

What is claimed is:

1. An apparatus for decoding a compressed audio/video signal by partitioning said decoding between pre-processing tasks and post-processing tasks, said apparatus comprising:

a host bus interface;

a processor coupled to said host bus interface, said processor receiving said compressed audio/video signal, said processor performing said pre-processing tasks on said compressed audio/video signal to produce pre-processed audio data and pre-processed video data;

a system memory coupled to said host bus interface, said host bus interface providing read and write accesses to said system memory;

a dedicated subprocessor coupled to said bus interface, said dedicated subprocessor interfaced with said system memory and said processor using said host bus interface, said dedicated subprocessor performing said post-processing tasks including audio post-processing on said pre-processed audio data to produce a decoded audio signal, and video post-processing on said pre-processed video data to produce a decoded video signal, said dedicated subprocessor comprising:

a memory management unit for transferring said pre-processed audio data, said pre-processed video data, said decoded audio signal and said decoded video signal to and from said system memory and said processor;

a memory controller unit to interface with said memory;

a memory management unit coupled to said memory controller unit, said memory management unit comprising arbitration logic and address generation logic;

an audio/video data signal processor coupled to said memory management unit, said audio/video data signal processor performing said audio post-processing on said pre-processed audio data, and performing said video post-processing on pre-processed video data;

a video signal processor coupled to said audio/video data signal processor, said video signal processor performing said video post-processing on said pre-processed video data including inverse discrete cosine transformation, motion compensation, and block reconstruction;

a frame packer unit coupled to said memory management unit, said frame packer unit performing video frame output tasks; and a memory coupled to said dedicated subprocessor.

2. The apparatus of claim 1, wherein said system memory stores said pre-processed audio data and said pre-processed video data.

3. The apparatus of claim 1, wherein said system memory and said memory coupled to said dedicated subprocessor are combined as a single memory unit.

4. The apparatus of claim 1 wherein said bus interface comprises a PCI bus interface.

5. An apparatus for decoding a compressed audio/video signal, said apparatus comprising:

a host bus interface;

a processor coupled to said host bus interface, said processor performing non-signal processing oriented tasks associated with decoding of said compressed audio/video signal;

a system memory coupled to said host bus interface, said host bus interface providing read and write accesses to said system memory; and a dedicated subprocessor coupled to said host bus interface, said dedicated subprocessor coupled to said system memory and said processor using said host bus interface, said processor performing signal processing oriented tasks associated with decoding of said compressed audio/video signal, said dedicated subprocessor comprising:

a memory management unit for transferring said pre-processed audio data, said pre-processed video data, said decoded audio signal and said decoded video signal to and from said system memory and said processor;

a memory controller unit to interface with said memory;

a memory management unit coupled to said memory controller unit, said memory management unit comprising arbitration logic and address generation logic;

an audio/video data signal processor coupled to said memory management unit, said audio/video data signal processor performing said audio post-processing on said pre-processed audio data, and performing said video post-processing on pre-processed video data;

a video signal processor coupled to said audio/video data signal processor, said video signal processor performing said video post-processing on said pre processed video data including inverse discrete cosine transformation, motion compensation, and block reconstruction; and a frame packer unit coupled to said memory management unit, said frame packer unit performing video frame output tasks.

* * * * *